United States Patent
Lejeune

[15] 3,638,180
[45] Jan. 25, 1972

[54] ALARM FOR SIGNALLING TIRE MALFUNCTION

[72] Inventor: Daniel Lejeune, Clermont-Ferrand, France

[73] Assignee: Compagnie Generale Des Etablissements Michelin, raison sociale Michelin & Cie., Clermont-Ferrand, France

[22] Filed: July 23, 1969

[21] Appl. No.: 844,096

[30] Foreign Application Priority Data

July 29, 1968 France....................................161063
May 23, 1969 France..................................6917132

[52] U.S. Cl..............................................340/58, 335/205
[51] Int. Cl............................................................B60c 23/00
[58] Field of Search....................335/205; 340/57, 63, 60, 58

[56] References Cited

UNITED STATES PATENTS

| | | |
|---|---|---|
| 2,629,086 | 2/1953 | Ainsworth et al.........................340/58 |
| 3,093,812 | 6/1963 | Brown.......................................340/58 |
| 3,226,506 | 12/1965 | Angrisani................................335/205 |
| 3,235,726 | 2/1966 | Haller....................................340/58 X |
| 3,445,796 | 5/1969 | Spiroch et al..........................335/205 |
| 3,521,230 | 7/1970 | Poole........................................340/58 |

Primary Examiner—Donald J. Yusko
Assistant Examiner—Howard Cohen
Attorney—Brumbaugh, Graves, Donohue & Raymond

[57] ABSTRACT

A permanent magnet is mounted on each wheel of an automotive vehicle. In case of low pressure in one of the vehicle tires, the external magnetic field of the magnet mounted on the wheel for that tire is modified by an automatic movement of either the magnet or a shunt associated therewith. A magnetic field responsive switch is mounted on the vehicle frame next to each wheel-tire assembly. The switch next to the malfunctioning tire responds to the change in the magnetic field to activate a signal alerting the driver of the vehicle.

4 Claims, 9 Drawing Figures

INVENTOR
DANIEL LEJEUNE
BY
Brumbaugh, Graves, Donohue & Raymond
his ATTORNEYS

INVENTOR
DANIEL LEJEUNE
BY
Brumbaugh, Graves, Donohue & Raymond
his ATTORNEYS.

3,638,180

ALARM FOR SIGNALLING TIRE MALFUNCTION

BACKGROUND OF THE INVENTION

This invention relates to alarms and, more particularly, to a novel and highly effective alarm for indicating to the operator of a machine such as an automotive vehicle, during the operation of the machine, a malfunction associated with a rotating part thereof, such as a wheel-tire assembly. The alarm can be made to respond to a wide variety of malfunctions, including insufficient or excess pressure, abnormal heating, and other similarly abnormal conditions.

Various devices have been proposed which make it possible to detect and indicate abnormal conditions in the tires of a moving vehicle, with the help of some physical or mechanical connection or electrical contact between each turning wheel-tire assembly and the vehicle proper. However, these known devices have the disadvantage of being comparatively complex, which renders them relatively expensive to manufacture and sometimes fragile in use.

SUMMARY OF THE INVENTION

An object of the present invention is to remedy these and other disadvantages of prior art devices by providing a rugged and highly reliable device of very simple design and execution.

The foregoing and other objects are attained in accordance with the invention by the provision of an alarm device for tires characterized in that it comprises, integral with the frame of an automotive vehicle and forming part of a signal circuit, an element responsive to magnetic field variations and, integral with the rotating assembly formed by the wheel and the tire, a permanent magnet and means making it possible to vary (move, shunt or restore) the external magnetic field of the magnet. Depending on the variation of the external field of the permanent magnet, the voltage in the terminals of the magnetic field responsive means varies, and this variation is made use of in the signalling circuit to activate a light or sound signal for alerting the driver of the vehicle.

In a device constructed in accordance with the invention, magnetic field responsive means attached to the frame of the automotive vehicle is in such a position that it is capable of responding to the magnet (depending on the state of the external magnetic field), which is attached to the wheel, each time the magnet passes in the proximity of the magnetic field responsive means. The magnet is active only in case of an abnormal condition and is inactivated in the absence of any such abnormal condition. In order to neutralize the magnet in the absence of an abnormal condition, a shunt may be used: i.e., a magnetic metal shield of some suitable form. The shunt when covering the poles of the magnet deviates the magnetic lines of force and concentrates them in the magnetic shunt. Thus, the magnetic field is eliminated or reduced in the vicinity of the element sensitive to change of the magnetic field. Moreover, by normally neutralizing the magnet, the shunt prevents the magnet from attracting magnetic metal particles otherwise within reach of the field of the magnet. Such particles, if allowed normally to collect on the poles of the magnet, might in time render the magnet unable to act on the magnetic field responsive means.

The element sensitive to a change of the magnetic field may be a flexible blade switch, a magnetodiode, a magnetic resistance, or a Hall-effect cell.

A flexible blade switch consists of two flexible blades of magnetic metal, generally sealed in a hermetically closed tube. These blades are normally spaced apart. If they are subjected to a suitably oriented and sufficiently strong magnetic field, they attract each other and come into contact, thus closing an electric circuit in which they are connected. The blades separate as soon as they are removed from the magnetic field. Such switches are at present on the market.

A magnetic diode is a semiconductor diode which becomes more or less conductive under the influence of a magnetic field.

A magnetic resistance is a resistance the value of which depends upon the magnetic field in which it is placed.

A Hall-effect cell comprises a plate traversed by a feeder current and subjected to a magnetic field perpendicular to the plane of the plate. As a result, a so-called Hall voltage is obtained which originates under the influence of the field between the two surfaces of the plate and is a function of the field value and of the feed current.

These various elements are well known (see McGraw-Hill Encyclopedia of Science and Technology, volume 6, pages 319–321 for a discussion of the Hall effect), and are currently on the market, for example, as distributed by Siemens under reference FP 28 D470, SV 130/1 or Sony under reference MD 130C.

Magnetic field responsive means such as a magnetic diode, magnetic resistance, or Hall-effect cell have several advantages over the flexible blade switches. They are smaller and less fragile and do not contain any moving parts; they are more sensitive so that great precision in positioning them is not required; and they are relatively insensitive to the frequency of magnetic impulses and thus to changes in the speed of rotation of the wheel.

The position of the magnet is preferably fixed in relation to the wheel on which it is mounted, and the shunt is movable and can be displaced in such a manner as to shunt or restore the external magnetic field.

In another embodiment, the shunt is fixed in relation to the wheel while the magnet is movable and capable of occupying an inactive position in which it is shunted and an active position in which it is not.

The magnet is preferably U-shaped and the shunt is in the shape of a blade or strip which, in the shunting position, covers the two poles of the magnet without being in contact with them. One may also use a bar-shaped magnet of any desired cross section and a shunt constituted by a U-shaped strip, whereby the branches of the U in the shunting position cover without touching the pole surfaces of the magnet.

The relative displacement of the shunt and the magnet may be effected by a movement of rotation and/or translation. In order to produce this relative displacement, any suitable device can be used. For example, the shunt or the magnet can be integral with a movable portion of monitor means such as a conventional pressure gauge or thermometer. One can also use a sensor directly transforming the variation of the magnitude to be monitored into displacement of the shunt and/or the magnet. The monitor means can also be used to set free a spring under tension, the freed spring then displacing the shunt or the magnet, causing a sudden quantum increase in the external field of the magnet.

In another embodiment of the invention, the change in the magnetic field is produced simply by rotation and/or translation of the magnet, it not being necessary to provide a shunt between the magnet and the magnetic field responsive means.

The magnetic field responsive means activates relay means which, in turn, activates a sound or light signal placed in such a position as to alert the driver.

As may be seen, the device in accordance with the invention makes use of simple and rugged components only and operates efficiently and reliably. Specifically, the operation of the device is not a function of the speed of the vehicle, and it has little sensitivity to changes in the closest point of approach between the element sensitive to a variation of the magnetic field and the path of the magnet. The interval may be as great as about 10 millimeters without causing any disadvantage.

BRIEF DESCRIPTION any THE DRAWING

An understanding of additional aspects of the invention may be gained from a consideration of the following detailed description of a representative embodiment thereof, in conjunction with the accompanying figures of the drawing, wherein.

Figure 5:
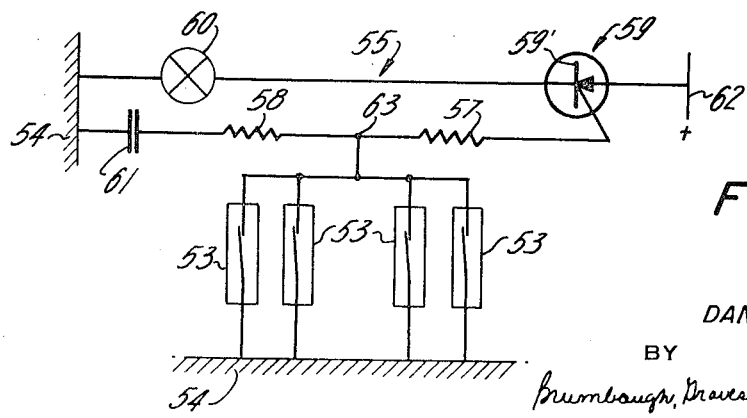
Figure 4:
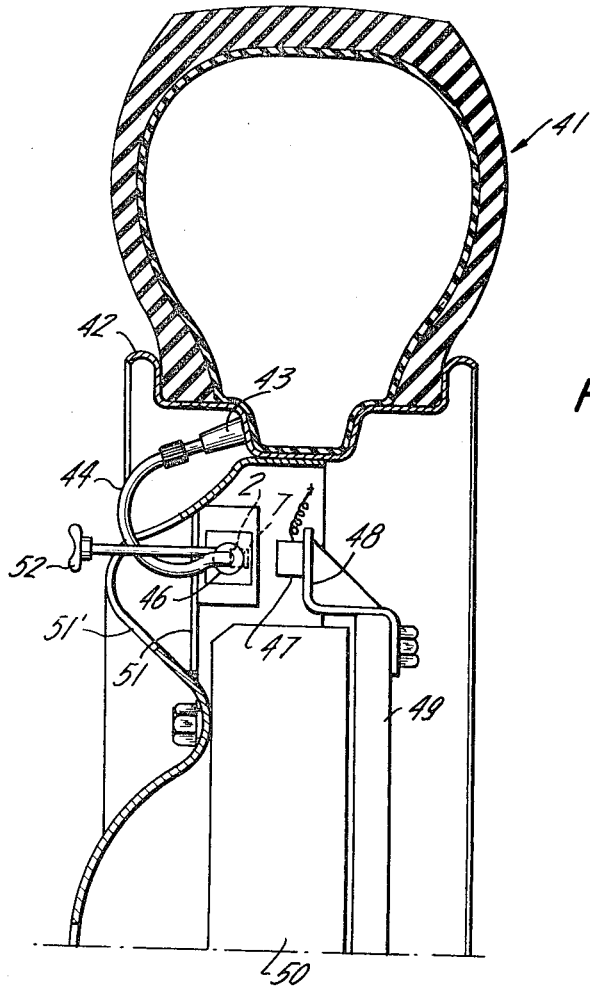

FIG. 4 fragmentary radial section of a wheel-tire assembly showing the device of the invention installed;

FIG. 5 is a schematic diagram of the signal wiring; and

FIGS. 6-9 are fragmentary schematic views of four additional embodiments of the invention.

DESCRIPTION OF THE PREFERRED EMBODIMENTS

Figure 1:
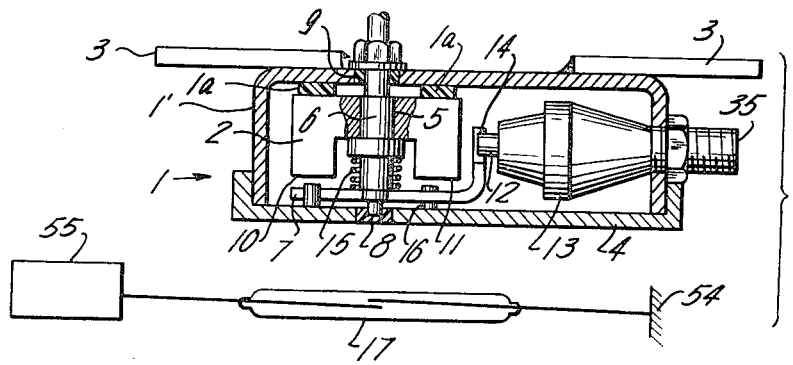
FIGS. 1 and 2 are partly sectioned in elevation and plan views, respectively, of a preferred embodiment of a tire deflation indicator constructed in accordance with the invention.
Figure 2:
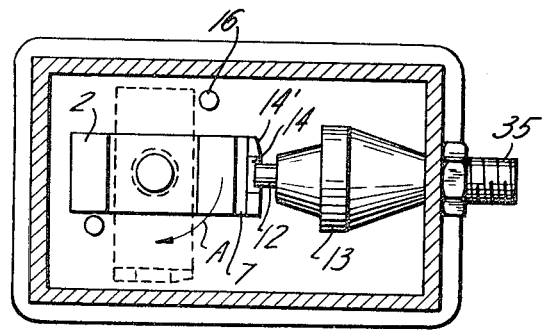

FIGS. 1 and 2 show a U-shaped permanent magnet 2 secured at 1a to the base 1' of a case 1. The case 1 is fixed by means of brackets 3 to the disk of a wheel (not shown in FIGS. 1 and 2) and is tightly closed by a lid 4. The magnet 2 is formed with a bore 5 through which passes loosely an axle 6 on which is fastened a magnetic shunt 7. The shunt 7 has the shape of a rectangular strip bent to form an L. The axle 6 pivots in bearings 8 and 9 arranged in the bottom of the case 1 and in the lid 4. Opposite the poles 10 and 11 of the U-shaped magnet 2 is shown a flexible blade switch 17 in opened position.

FIG. 1 shows the magnetic shunt 7 shunting the field emanating from the pole surfaces 10 and 11 of the magnet 2. Towards such end, the monitor means such as a pressure gauge 13 is in a locking position, the pin 12 of the pressure gauge 13 being lodged in a notch 14 of the shunt 7, immobilizing the shunt 7 opposite the poles 10 and 11 of the magnet 2.

In case of an abnormal condition in the inflation pressure of the tire, the gauge 13 moves to an unlocking position. In this position, the pin 12, which is pressure responsive, retracts inside the indicator gauge 13, thereby freeing the shunt 7. A spring 15 then turns the shunt 7 through an angle of 90° in the direction of the arrow (FIG. 2) and immobilizes it, as shown in dotted outline in FIG. 2, against a stop pin 16 projecting inwardly from the lid 4.

Figure 3:
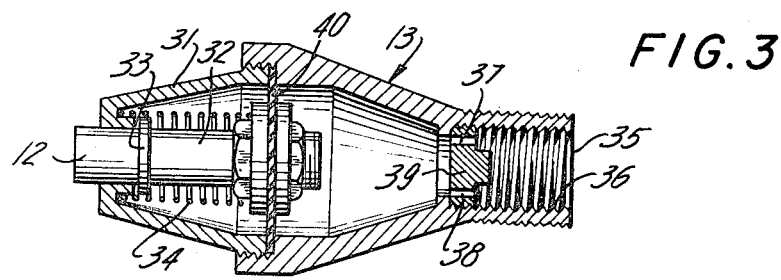
FIG. 3 is a partly sectioned longitudinal elevation of a pressure indicator gauge for use in accordance with the invention.

FIG. 3 show in greater detail the pressure gauge 13 of FIGS. 1 and 2, including the pin 12 (shown in its protruding position) which is to be accommodated by the retaining groove 14 of the shunt 7 (FIGS. 1 and 2). The pin 12 protrudes through the case 31, which serves as its guide, and is an extension of a pusher 32 provided with a stop 33. A spring 34, which is calibrated as a function of the alarm threshold, is compressed by the compressed air that inflates the tire and communicates with a flexible diaphragm 40. Communication between the flexible diaphragm 40 and the tire inflation air is established through the opposite end 35 of the indicator gauge 13, which is connected by means of threading 36 with the tire inflation valve (not shown). The end 35 of the gauge 13 is provided with apertures 37 and 38 formed in a stop 39 so that the tire inflation air exerts pressure on the of the diaphragm 40. The diaphragm 40 is fastened at its center to the pusher 32 and gripped circumferentially between the two halves of the case 31. The purpose of this diaphragm 40 is to ensure tightness between the interior of the tire under pressure and the surrounding air and to maintain the pin 12 in its protruding position so long as the air pressure in the tire is normal.

FIG. 4 shows in radial section a wheel-tire assembly including a casing 41 installed on a rim 42. A valve opening 43 is connected by a flexible and airtight hose 44 to the valve proper 46. The valve 46 is screwed onto the pressure gauge 13, which in turn is secured in the case containing the permanent magnet 2 and its shunt 7 (in FIG. 4, the magnet 2 and shunt 7 are indicated in dashes, the shunt 7 occupying the position in which it shunts the external magnetic field of the magnet 2). The fastening brackets 51 of the case are secured by any suitable means such as welding or soldering to the wheel disk 51'. The warning device including the magnet 2 and shunt 7 is shown during its passage at a normal distance of 10 millimeters opposite magnetic field responsive means such as a flexible blade switch, magnetic diode, magnetic resistance, or Hall-effect cell 47 enclosed in a protective hood and fastened by means of an S-shaped support 48 to a stationary disk 49 outside the brake drum 50.

The axle 6 of the shunt (see FIGS. 1 and 2) is extended and passes through the wheel disk 51', ending in a wingnut 52 the angular position of which indicates whether the device has or has not been actuated. The disk 51' may be provided with calibrations facilitating interpretation of the wingnut orientation. In case of actuation, i.e., if the shunt has turned 90° in one direction, it suffices to turn the wingnut 52 90° in the opposite direction in order to reset the device.

To that end, a portion of the shunt 7 adjacent to the slot 14 may be beveled to form a cam surface 14' (FIG. 2) adapted to push in the pin 12 and allow it to pop into the slot 14 under the urging of the tire inflation pressure acting on the diaphragm 40 (assuming the tire is inflated properly). Thus, after the damage to the tire has been repaired and the tire inflated again, the pin 12 of the indicator valve 13 is again in projecting position and holds the shunt 7 in shunting position by interlocking with the groove 14, as shown in FIGS. 1 and 2.

FIG. 5 shows four magnetic field responsive means such as flexible blade switches 53 each fastened separately for cooperation with a separate magnet-shunt assembly as previously described. The switches 53 are connected, on the one hand, to a common ground 54, for example the frame of the vehicle, and, on the other hand, to a junction 63. The junction 63 is in turn connected to a single signalling circuit 55 between resistances 57 and 58. The circuit 55 comprises a transistor 59 the emitter of which is connected to the positive pole of a source of current 62 (the car battery, for example). If one of the four switches 53 is closed because of malfunctioning of the wheel-tire assembly with which it is associated, the transistor base 59' receives an impulse from the closed switch through the resistor 57. This renders the transistor conductive, and signal means such as a light or sound generator 60 connected between the collector of the transistor 59 and the ground 54 is activated. The signal means may be, for example, a light signal which lights up under the eyes of the driver at each turn of the wheel. In order to protect the contacts of the flexible blade switch 53 and also in order to extend sufficiently the period of blinking of the light bulb, a connection to ground is provided from the output 63 of the switches 53 through a resistance 58 connected in series with a condenser 61.

It is not necessary to have one signalling circuit 55 common to all the flexible blade switches: there may be a separate one for each wheel or one for the front wheels and another for the back wheels, etc.

Figure 6:
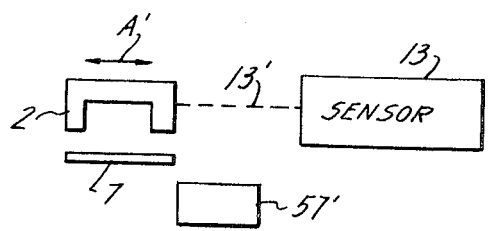

FIG. 6 shows schematically the case where the sensor 13 directly moves the magnet 2, to which it is connected by mechanical linkage 13'.

Figure 8:
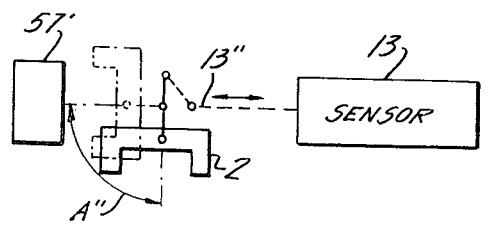
Figure 7:
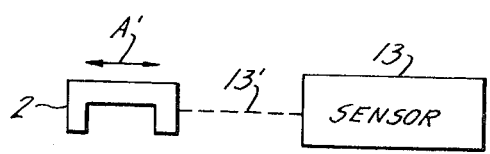

FIGS. 7 and 8 are like FIG. 6 except that the shunt 7 is omitted, and in FIG. 8 the linkage 13" establishes rotational movement of the magnet 2, as shown by an arrow A", rather than translational movement, as shown by arrows A'.

Figure 9:
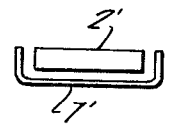

FIG. 9 shows the embodiment wherein the magnet 2' is a bar magnet and the shunt 7' is U-shaped.

Thus, there is provided in accordance with the invention a novel and highly effective alarm for indicating to the operator of a machine such as an automotive vehicle, during the operation of the machine, a malfunction associated with a rotating part thereof, such as a wheel-tire assembly. Many modifications of the representative embodiment described above will readily occur to those skilled in the art, and the invention is to be construed as including all such modifications that are within the scope of the appended claims.

I claim:

1. An alarm for indicating to the operator of a machine such as an automotive vehicle, during operation of the machine, a malfunction associated with a rotating part thereof such as a wheel-tire assembly, comprising magnetic field responsive means mounted on the machine, the magnetic field responsive means being responsive to a static magnetic field, signal means mounted in a position such that when activated, the operator is appraised of its activation, circuit means connecting said signal means to said magnetic field responsive means for response thereto, a permanent magnet mounted on said rotating part for movement along a path that is substantially stationary with respect to the machine and at a substantially constant distance from the magnetic field responsive means, and varying means operatively associated with said permanent magnet for maintaining the external magnetic field thereof at a low value when said rotating part is functioning properly and causing a sudden quantum increase in the external magnetic field thereof in response to a malfunction of said rotating part, whereby a malfunction of said rotating part increases said external magnetic field in such a manner as to cause said magnetic field responsive means to activate said signal means.

2. An alarm according to claim 1 wherein said varying means comprises a shunt.

3. An alarm according to claim 2 wherein said magnet is U-shaped and said shunt is a straight strip for selectively shielding and unshielding said magnet, said shunt when shielding said magnet covering the two poles thereof while being in spaced-apart relation thereto.

4. An alarm for indicating to the operator a machine such as an automotive vehicle, during operation of the machine, a malfunction associated with a rotating part thereof such as a wheel-tire assembly, comprising magnetic field responsive means mounted on the machine, the magnetic field responsive means being responsive to a static magnetic field, signal means mounted in a position such that, when activated, the operator is apprised of its activation, circuit means connecting said signal means to said magnetic field responsive means for response thereto, a permanent magnet mounted on said rotating part for movement along a path that is substantially stationary with respect to the machine and at a substantially constant distance from the magnetic field responsive means, and varying means comprising a shunt operatively associated with said permanent magnet for reducing the external magnetic field thereof when said rotating part is functioning properly and increasing the external magnetic field thereof when siid rotating part is functioning improperly, whereby a malfunction of said rotating part increases said external magnetic field in such a manner as to cause said magnetic field responsive means to activate said signal means, said magnet and shunt being displaceable relatively to each other and said varying means further comprising spring means mounted adjacent to said magnet and shunt and monitor means movable between a locking position in which it immobilizes said magnet and shunt with respect to each other and an unlocking position, said monitor means in response to a malfunction of said rotating part moving to said unlocking position, said spring means then effecting relative displacement of said magnet and shunt.

\* \* \* \* \*

PO-1050
(5/69)

UNITED STATES PATENT OFFICE
CERTIFICATE OF CORRECTION

Patent No. 3,638,180　　　　　Dated　Jan. 25, 1972

Inventor(s)　Daniel Lejeune

It is certified that error appears in the above-identified patent and that said Letters Patent are hereby corrected as shown below:

Col. 2, line 65, "any" should be --OF--. Col. 3, line 1, after "4" should be --is a--; line 34, "show" should be --shows--; line 48, "of the" should be --flexible--. Col. 4, line 70, "appraised" should be --apprised--. Col. 5, line 16, after "operator" should be --of--. Col. 6, line 9, "siid" should be --said--.

Signed and sealed this 22nd day of August 1972.

(SEAL)
Attest:

EDWARD M. FLETCHER, JR.
Attesting Officer

ROBERT GOTTSCHALK
Commissioner of Patents